June 18, 1957

S. M. GODFREY 2,795,812

FISH SCALING MACHINE

Filed Nov. 21, 1955

INVENTOR.
Samuel M. Godfrey
BY
W. B. Harpman
ATTORNEY

June 18, 1957  S. M. GODFREY  2,795,812
FISH SCALING MACHINE
Filed Nov. 21, 1955  2 Sheets-Sheet 2
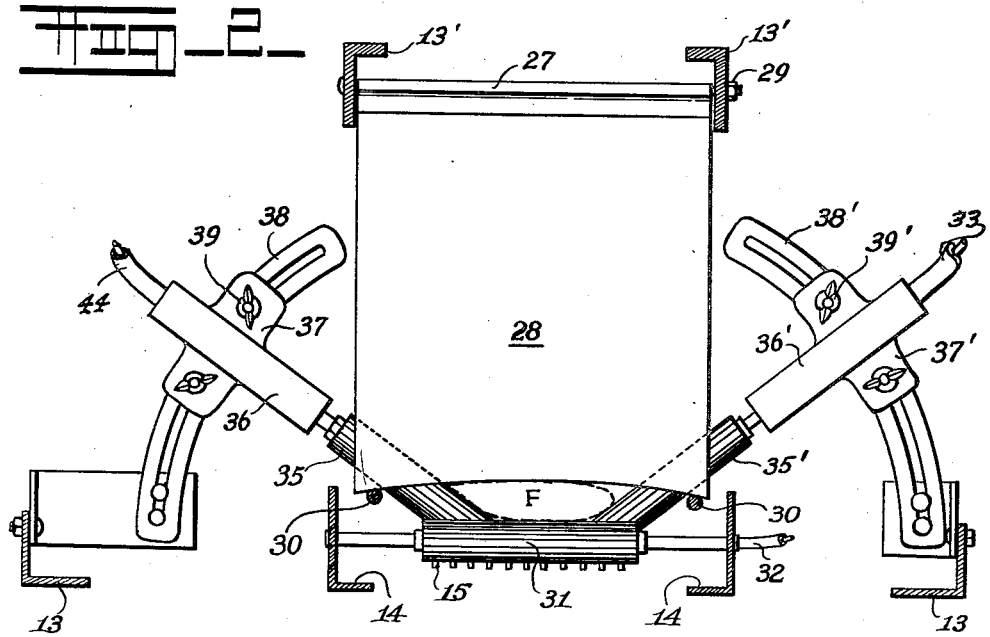
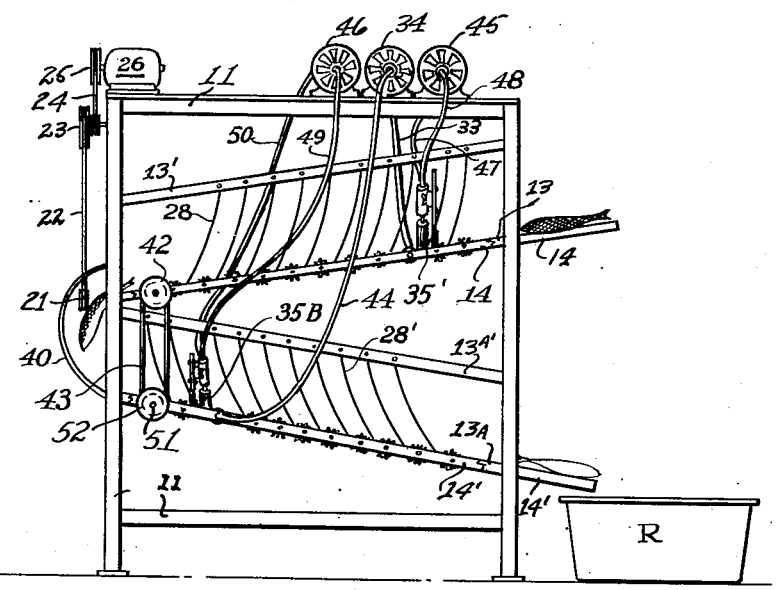
INVENTOR.
Samuel M. Godfrey
BY
W. B. Harpman
ATTORNEY

United States Patent Office 2,795,812
Patented June 18, 1957

2,795,812
FISH SCALING MACHINE
Samuel M. Godfrey, Sharon, Pa.

Application November 21, 1955, Serial No. 548,003

7 Claims. (Cl. 17—5)

This invention relates to a fish scaling machine and more particularly to an improved machine for that purpose.

The principal object of the invention is the provision of a fish scaling machine incorporating means for holding a fish tightly against descaling means while simultaneously moving the fish with respect to the descaling means.

A further object of the invention is the provision of an improvement by which a fish is passed over descaling elements and held against the same in a manner shaping the fish to correspond with the surface contour of the descaling elements whereby all of the scales are removed from the surfaces of the fish engaged against the descaling elements.

A still further object of the invention is the provision of a fish scaling machine in which a plurality of descaling elements are progressively arranged in opposed relation to a plurality of flexible means for holding and shaping the fish thereagainst and whereby fish may be continuously and rapidly processed by passing the same through the device.

A still further object of the invention is the provision of a fish scaling machine in which the descaling elements are rotatable with respect to the path of the fish presented thereto and wherein the descaling elements are adjustably mounted so that they may be shaped to conform with various shapes of fish to be descaled.

A still further object of the invention is the provision of a fish scaling machine which will rapidly and efficiently descale fish and which will operate with a minimum of attention and adjustment due to the provision and disposition of parts therein which adjust to the various sizes and shapes of the fish being descaled and thus automatically present appropriate surfaces of the fish to the descaling elements at all times.

Those skilled in the art will be familiar with the several types of fish scaling apparatus heretofore known in the art including the Fish Scaling Machine of my Patent No. 2,086,159 of July 6, 1937 which operates on the principle of impinging the fish on a projecting prong on a large wheel and moving the fish by the prong through the area of revolving descalers.

A different type of descaling machine is disclosed in the Brophy Patent 2,664,591 of January 5, 1954 wherein the fish are moved beneath a plurality of progressively arranged conveyor rolls and over a plurality of rotatable descaling elements which are positioned in oppositely disposed relation to the conveyor rolls.

The prior art machines descaled the major surfaces of the fish passed therethrough more or less successfully but almost with exception they left sections of the scales on the fish due to the inability of the machines to conform to the shape of the fish and thereby present the descaling means to all of the surfaces of the fish.

The present invention incorporates a plurality of rotatable conveyor rolls, the surfaces of which comprise a multiplicity of short spikes arranged in oppositely disposed relation to a plurality of thin sheet metal springs which are angularly disposed with respect to the path of the fish passing through the machine and whereby the conveyor rolls move the fish under tension over a plurality of thin sheet metal prongs.

The plurality of spring means and the conveyors progressively engage and shape the various parts of the fish so as to present them most effectively to rotatable descaling elements which are positioned intermediate the conveyor rolls and also diagonally with respect thereto so that the bottom and the sides of the fish passing therethrough are completely cleaned.

The machine incorporates duplicate assemblies so that when a fish has passed through one assembly it is turned over and passed through the second assembly whereby the opposite surface and sides are cleaned.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the function and scope of the invention.

The invention is illustrated in the accompanying drawings, wherein:

Figure 2 is an enlarged detail of the fish shaping and descaling elements.

Figure 3 is a side view of the fish scaling machine on a reduced scale with respect to Figure 1.

Figure 1:
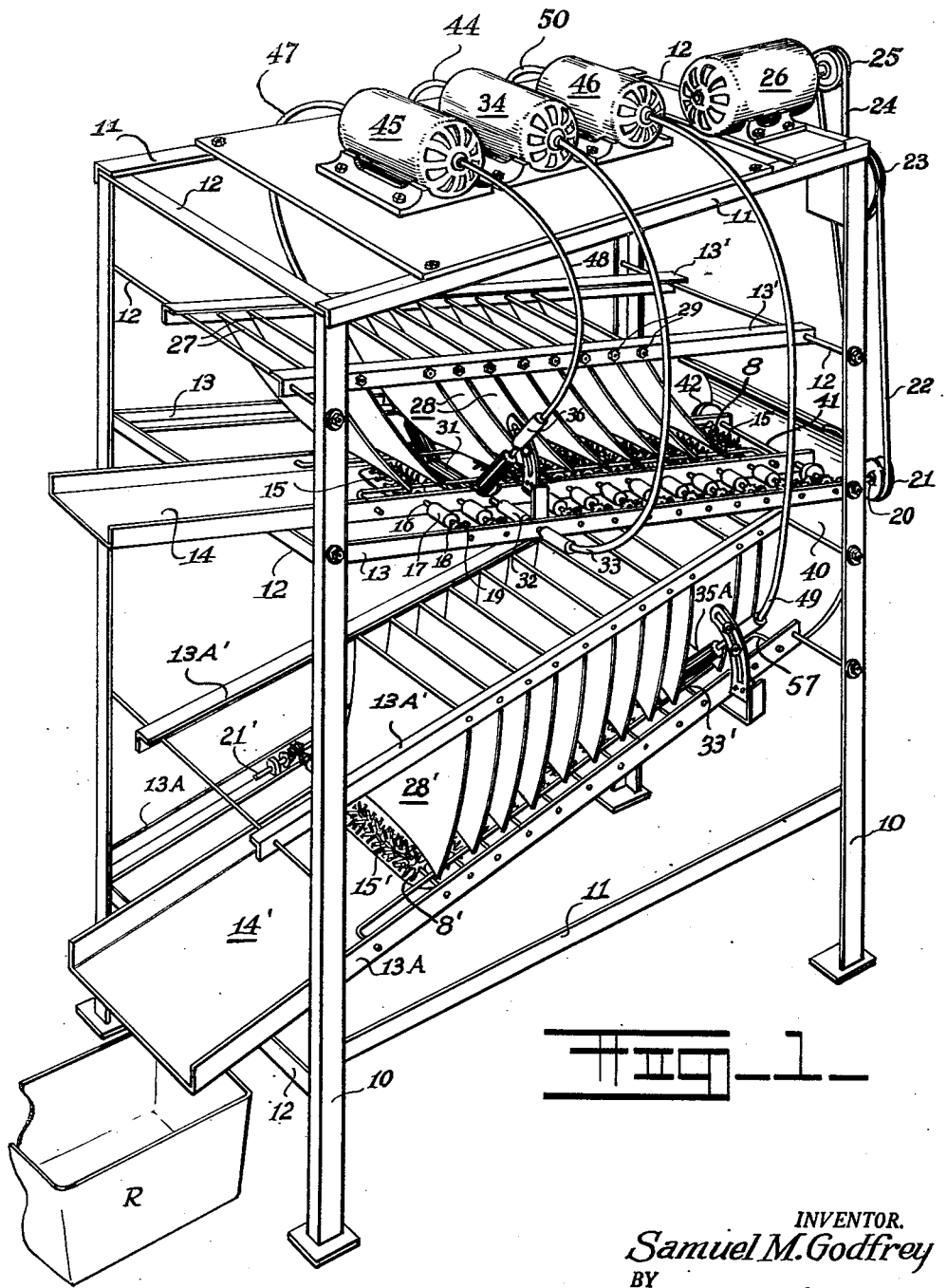
Figure 1 is a perspective view of the fish scaling machine.

By referring to the drawings and Figure 1 in particular it will be seen that the fish scaling machine comprises a frame incorporating a plurality of vertically disposed legs 10—10 and horizontally disposed members 11—11, the legs 10—10 and the horizontally disposed members 11—11 being spaced with respect to one another by end frame members 12—12.

A plurality of diagonal frame members 13—13 are positioned longitudinally of the device between the pairs of the end frame members 12—12 so that the diagonal frame members 13—13 define a diagonal path lengthwise of the machine. A chute 14 is positioned over one of the end frame members 12—12 and extends outwardly of the front end of the machine (the left side as seen in Figure 1 of the drawings), and the other end thereof is carried inwardly of the rear end of the machine by one of the end frame members 12—12 extending transversely thereof between the diagonal frame members 13—13.

The center area of the chute 14 is cutaway, as best shown in Figure 2 of the drawings, so that a plurality of conveyor rolls 15—15 may be disposed across the chute 14 in place of the bottom thereof, each of the conveyor rolls 15—15 comprising a plurality of multiple pointed discs 8—8 assembled on a drive shaft 16 and one outer end of which is coupled as at 17 to a pinion 18 which in turn engages a gear 19 on a longitudinally extending shaft 20 which is journaled along the inner side of one of the diagonal frame members 13—13.

The one end of the longitudinally extending shaft 20 has a pulley 21 on its outer end (the right end of the device as seen in Figure 1 of the drawings) and a belt 22 is trained over the pulley 21 and over a secondary pulley 23 mounted on the frame of the device thereabove. The pulley 23 is driven by a secondary belt 24 trained over a secondary pulley 25 on the driven shaft of a motor 26 mounted on top of the frame of the device. Thus, revolving motion is imparted to the longtudinally extending shaft 20 and hence to the plurality of conveyor rolls 15—15 which in effect form a continuation on the bottom of the chute 14.

A plurality of rods 27—27 are positioned transversely of the diagonal frame members 13'—13' which lie above the frame members 13—13 carrying the conveyor rolls 15—15, the rods 27—27 each having a depending diagonally shaped sheet metal spring 28—28 thereon and secured in fixed relation thereto so that by positioning the rods 27—27 in fixed relation to the diagonal frame members 13'—13' and securing them as by fasteners 29—29, the depending rectangular-shaped spring members 28—28 will engage a fish F placed in the chute 14 and moved therealong by the conveyor rolls 15—15. Each of the spring members 28—28 progressively engages the fish as it passes therethrough, and each of the spring members 28—28 holds the fish against the adjacent conveyor and/or descaling rolls 15—15. It will be observed that the lower portions of each of the spring members 28—28 are curved crosswise so that they tend to conform with the shape of the fish, as best seen in Figure 2 of the drawings.

By referring now to Figure 2 of the drawings it will be seen that a representation of a section of a fish is illustrated beneath the edge of one of the spring members 28—28 and it will be observed that the spring members 28—28 are prevented from moving downwardly into engagement with the conveyor rolls 15—15 by a pair of longitudinally extending guide rods 30—30 which are attached at their ends to the sides of the chute 14.

A transversely positioned descaling roll 31 is located between a pair of conveyor rolls 15—15 and is journaled on the opposite sides of the chute 14 and is connected by a coupling 32 with a flexible shaft 33 which in turn extends to a driven shaft of a motor 34 located on top of the device.

A pair of diagonally positioned descaling rolls 35—35' are positioned in oppositely disposed relation adjacent the descaling roll 31 and are supported by tubular journals 36 and 36' which in turn are provided with oppositely disposed apertured brackets 37 and 37' which are in turn adjustably mounted on arcuate frame members 38 and 38' by means of slots formed therein and fasteners 39 and 39' passed therethrough.

The arcuate frame members 38 and 38' are mounted on the diagonal frame members 13—13 and positioned so that when the tubular journals 36 and 36' are moved with respect to the arcuate frame members 38 and 38', the motion will be arcuate based on the outermost free ends of the descaling rolls 35 and 35'.

It will thus be seen that a fish positioned in the chute 14 will slide by gravity into engagement with the conveyor rolls 15—15 which are composed of the pointed discs 8—8 and that it will be grasped thereby and moved progressively along the series of conveyor rolls 15—15 beneath the series of spring members 28—28 each of which will urge the fish to conform to the shape of the conveyor rolls and, more importantly, to the shape of the descaling rolls 31 and 35 and 35' as the fish moves thereacross.

The chute 14 is preferably positioned on approximately a thirty degree angle with respect to horizontal so that this action may readily take place.

It will be observed by referring to Figure 3 of the drawings that the fish are preferably fed head-first so that they engage the descaling rolls which are spinning at approximately 3500 R. P. M. and the action thereby quickly removes the scales as the fish pass over the descaling rolls.

The spring members 28—28 are adjustable with respect to the tension exerted on the upper surface of the fish by reason of their mounting, a hereinbefore described, and the spring members 28—28 hold the fish during the descaling operation and prevent the descaling rolls from kicking the fish forwardly as would otherwise occur. The spring members 28—28 thus hold the fish securely against the multiple pointed discs 8—8 of the conveyor rolls 15—15 so that the fish moves at a predetermined rate of travel through the descaling section and is thereby efficiently descaled.

When the fish has traveled from the front end to the back end of the machine, from the left to the right as seen in Figure 1 of the drawings, or from the right to the left, as seen in Figure 3 of the drawings, it engages an arcuate guide 40 which causes the fish to drop downwardly and inwardly, as best seen in Figure 3 of the drawings, and at the same time turns it upside down so that the side which had been on the bottom as it traveled down the chute 14 and was descaled is now on the upper surface and the opposite side is on the bottom and thereby positioned for a subsequent descaling action of that side.

A duplicate assembly of conveyor rolls 15'—15', spring members 28'—28' and descaling rolls 31', 35 and 35A are arranged at an oppositely disposed thirty degree inclination so that the fish travels therethrough and is delivered from the front of the machine and into a receptacle R.

The delivery chute in the lower duplicate assembly of the descaler is indicated by the numeral 14' and it will be observed that it is formed in the same manner as the hereinbefore described chute 14 with the exception that the cutaway area thereof in which the conveyor rolls 15'—15' are disposed is located adjacent the inner feed end of the chute rather than the inner delivery end as in the case of the first described chute 14.

The conveyor rolls 15'—15' are geared to and driven by a secondary longitudinally disposed shaft 21' which is positioned alongside of and journaled on one of the diagonal frame members 13A. The secondary longitudinally disposed shaft 21' is geared to and driven by a drive shaft 51 carried on the diagonal frame members 13A—13A. A pulley 52 on the drive shaft 51 is driven by a belt 43 trained thereover and over a pulley 42 on the end of a drive shaft 41 which is carried by the diagonal frame members 13—13. The drive shaft 41 is geared to and driven by the longitudinally extending shaft 20 hereinbefore referred to.

Thus, the driving motor 26 drives the conveyor rolls 15—15 and 15'—15' of the upper and lower descaling assemblies in the device, and in a similar manner the driving motor 34 drives the descaling roll 31 by way of the flexible shaft 33 also drives the horizontal descaling roll 31' in the lower assembly by means of a flexible shaft 44.

The diagonally disposed descaling rolls 35 and 35' of the upper assembly are driven by a driving motor 45 through flexible shafts 47 and 48. Duplicate diagonally positioned descaling rolls 35A and 35B of the lower assembly are driven by a driving motor 46 through flexible shafts 49 and 50.

It will thus be seen that the conveyor rolls 15—15 of the upper assembly and 15'—15' of the lower assembly are both driven by the driving motor 26 while the horizontal descaling rolls 31 and 31' are driven by the driving motor 34 and the diagonally positioned descaling rolls of the upper assembly are driven by the driving motor 45 and the diagonally positioned descaling rolls of the lower assembly are driven by the driving motor 46 which enables the fish to be descaled rapidly and efficiently as different motors carry different loads at different times and there is no possibility of overloading the driving means of any one assembly at any one time.

It will occur to those skilled in the art that the positioning of the diagonally positioned descaling rolls 35 and 35' of the upper assembly and 35A and 35B of the lower assembly may be changed from time to time as desired to set up the descaling device for handling different kinds of fish so that the positioning of the descaler rolls correspond more closely to the actual shape of the fish particularly as the fish is held thereagainst by the plurality of spring members 28—28 and 28'—28'.

The lower edges of the spring members 28—28 are curved transversely and thereby maintain continuous close engagement with the fish as the same pass thereunder and facilitate the descaling operation by acting as scrapers or wipers and at the same time prevent the scales removed from the fish from being thrown longitudinally of the actual descaling sections of the device.

It will thus be seen that the several objects of the invention have been met by the fish scaling machine disclosed herein.

Having thus described my invention, what I claim is:

1. In a fish scaling machine comprising means forming a path along which fish travel successively, a plurality of conveyor rolls defining portions of said path, means for rotating said conveyor rolls, a plurality of leaf springs positioned adjacent said path and at an angle with respect to the plane of said path and with free ends in closely spaced relation to said conveyor rolls whereby a fish traveling on said path is progressively urged by said leaf springs against said conveyor rolls, at least one descaler roll positioned between adjacent conveyor rolls and parallel therewith and at least one pair of diagonally positioned descaler rolls adjacent said first mentioned descaler roll, and with said descaler roll forming a portion of said path over which said fish travels, and means for driving said descaler rolls whereby the bottom and sides of the fish traveling on said path may be descaled.

2. The improvement in a fish scaling machine set forth in claim 1 wherein the drive means for the conveyor rolls and descaler rolls are separate and wherein the leaf springs are rectangular and spaced with respect to one another.

3. The improvement in a fish scaling machine set forth in claim 1 wherein the leaf springs comprise substantially rectangular sections of sheet metal having spring-like characteristics having means across their upper edges supporting the same in fixed position relative to said machine, the lower edges of said springs being shaped to engage fish on said path moved therebeneath by said conveyor rolls.

4. The improvement in a fish scaling machine set forth in claim 3 and wherein the bottom edges of the rectangular springs are curved transversely.

5. The improvement in a fish scaling machine as set forth in claim 1 wherein each of the leaf springs is mounted on said fish scaling machine in an adjustable manner so that the tension between the bottoms of the said leaf springs and fish traveling on said path may be varied.

6. The improvement in a fish scaling machine as set forth in claim 1 wherein the conveyor rolls each comprise a plurality of discs having circumferentially spaced radially extending teeth thereon assembled in spaced relation on a common shaft and wherein the descaling rolls comprise rolls having longitudinally extending, circumferentially spaced, sharp edges thereabout.

7. The improvement in a fish scaling machine as set forth in claim 1 wherein the drive means for the conveyor rolls comprises rotatable shafts disposed longitudinally of said machine at right angles to said conveyor rolls and geared thereto and wherein a motor is coupled to said shafts for driving the same.

References Cited in the file of this patent
UNITED STATES PATENTS

| | | |
|---|---|---|
| 613,762 | Gahm | Nov. 8, 1898 |
| 861,395 | Russell | July 30, 1907 |
| 2,086,159 | Godfrey | July 6, 1937 |
| 2,664,591 | Brophy | Jan. 5, 1954 |
| 2,702,922 | Thibodeau | Mar. 1, 1955 |